United States Patent [19]

Chiu

[11] 4,391,836

[45] Jul. 5, 1983

[54] PROCESS FOR PREPARING INSTANT GELLING STARCHES

[75] Inventor: Chung-Wai Chiu, Westfield, N.J.

[73] Assignee: National Starch and Chemical Corporation, Bridgewater, N.J.

[21] Appl. No.: 376,348

[22] Filed: May 10, 1982

Related U.S. Application Data

[63] Continuation-in-part of Ser. No. 176,320, Aug. 8, 1980.

[51] Int. Cl.$^3$ .................... A23L 1/195; A23L 1/187; A23L 1/04; A23L 1/06
[52] U.S. Cl. .................................. 426/578; 426/579; 426/661; 127/32; 127/71; 536/102; 536/106
[58] Field of Search .................. 426/578, 579, 661; 127/32, 71; 536/102, 106

[56] References Cited

U.S. PATENT DOCUMENTS

| | | | |
|---|---|---|---|
| 3,527,606 | 9/1970 | Taylor et al. | 536/102 |
| 3,578,497 | 5/1971 | Hjermstad | 127/32 |
| 3,583,874 | 6/1971 | Germino et al. | 426/579 |
| 3,650,770 | 3/1972 | Marotta et al. | 426/578 |
| 3,977,897 | 8/1976 | Wurzburg | 536/102 |
| 4,013,799 | 3/1977 | Smalligan | 426/801 |
| 4,155,884 | 5/1979 | Hughes | 536/102 |
| 4,207,355 | 6/1980 | Chiu | 426/578 |
| 4,228,199 | 10/1980 | Chiu | 426/578 |
| 4,229,489 | 10/1980 | Chiu | 426/578 |
| 4,303,451 | 12/1981 | Seidel et al. | 127/32 |

Primary Examiner—Jeanette M. Hunter
Attorney, Agent, or Firm—Edwin M. Szala; Margaret B. Kelley

[57] ABSTRACT

Instant gelling tapioca or potato starches characterized by forming at least a weak gel having Bloom strengths of about 70 grams are prepared by forming an aqueous slurry of native tapioca or potato starch at a pH of about 5–12, drum drying the slurry to render the starches cold-water-dispersible, and heat treating the drum-dried starch to reduce its viscosity to within defined Brabender viscosity limits. The heat treatment is carried out in a conventional heating device, such as an electric or gas oven or a dextrinizer, for about 1.5–24 hours at about 125°–180° C. Lightly converted (fluidity) starches can also be used to prepare instant gelling starches provided the pH is above 6.5 and the proper time and temperature are selected for the heat-treatment. The instant gelling starch are particularly useful in food systems of the type which gel upon standing, such as pie fillings, jellies and puddings.

14 Claims, No Drawings

4,391,836

1

PROCESS FOR PREPARING INSTANT GELLING STARCHES

This application is a continuation-in-part of Ser. No. 176,320 filed Aug. 8, 1980.

BACKGROUND OF THE INVENTION

The present invention relates to cold-water-dispersible, modified starches characterized by their instant gelling properties and to a process for their preparation. It also relates to food systems containing such starches.

It is often desirable to prepare food systems which have a set or gel texture, such as pie fillings, puddings and jellies. Many of these food systems containing gelling agents which must be cooked to effect gelation. Such gelling agents include agar, gelatin, corn starch, pectin, carrageenin, algin, and combinations of locust-bean gum and xanthan gum. In addition, starches derived from, e.g., corn, potato, tapioca, and wheat which are acid-converted to a certain water fluidity level will retrograde to a gel when cooked.

An example of a food product which requires cooking to effect gelation is the conventional starch-based pudding, which generally consists of an ungelatinized starch, flavorings, sweetening agents, etc. Such puddings are prepared for consumption by adding milk, cooking until the starch is gelatinized, pouring the cooked mixture into a bowl or individual serving dishes, and cooling and/or refrigerating.

There are, however, certain disadvantages associated with food systems of this type. In addition to the fact that cooking of the food system is necessary to impart the gel texture thereto, many of the gelling agents used in these systems require specific conditions. Thus, for example, gelation can be used only after dissolution in very hot water, and typical pectins for use in jellies require about 65% sugar solids to produce a gel.

There are food systems which have a set or gel texture which forms without cooking. Most of these products are milk-based and consist of pregelatinized (i.e., cold-water dispersible) starch, one or more setting agents, which are usually phosphate salts (e.g., tetrasodium pyrophosphate), and flavoring, sweetening, and coloring agents. The set or gel properties of these food systems are obtained from the interaction of the phosphate salts with the casein and calcium ion provided by the milk, and not with the starch ingredient in the formulation. The pregelatinized starch functions as a viscosity builder or thickening agent, but is not the prime factor in the development of the gel structure of the prepared food system.

The major drawback of these uncooked, so-called "instant", food systems it that they do not have the firm gel structure of the cooked systems, i.e., they do not cut as cleanly with a spoon; and their texture, rather than being smooth, is generally described as "grainy" in both appearance and "mouth-feel" characteristics. Moreover, the setting salts are not operative at low pH or in non-milk-based food systems.

U.S. Pat. No. 3,583,874 issued June 8, 1971 to F. Germino et al. discloses a starch composition suitable as gelling agent in instant puddings, which comprises a blend of pregelatinized, defatted starch and a granular, preswollen starch having a water fluidity in a certain range.

The process disclosed in U.S. Pat. No. 4,207,355 issued June 10, 1980 to C.-W. Chiu et al. to produce a cold-water-dispersible, modified tapioca starch which has instant gelling properties consists of converting the starch to a certain water fluidity, crosslinking the starch, and then drum drying the converted, crosslinked starch. The reverse process is described in U.S. Pat. No. 4,229,489 issued Oct. 21, 1980 to C.-W. Chiu et al. Further, U.S. Pat. No. 4,228,199 issued Oct. 14, 1980 to C.-W. Chiu et al. discloses a cold-water-dispersible potato starch prepared by drum drying a crosslinked, and optionally fluidized (i.e. converted) starch.

In some applications, however, chemically altered starches are undesirable or unacceptable, as in certain food uses, and efforts are being made to prepare non-chemically modified starches, i.e. starches that do not have substituents introduced through covalent linkages. The prior art methods for producing non-chemically modified starches involved heat-moisture treatments that have resulted in inhibited starches having properties similar to those of chemically crosslinked starches, but these treatments have not produced instant gelling starches.

One such treatment is described by L. Sair in "Methods in Carbohydrate Chemistry,", Vol IV (Starch), pp. 283-285, R. L. Whistler, ed. (Academic Press, New York 1964). The treatment changes the sorption properties of the starch with corresponding changes in gelatinization temperature, translucency, and pasting characteristics. It is carried out by heating the starch in a pressure cooker at 100% relative humidity for from 2–18 hr. at 95° C. or for up to 16 hr. at 100°–110° C. The treatment can also be carried out in an air oven after adjusting the starch's moisture content to about 18–27%. The resulting starches are not pregelatinized (i.e., instant) nor are they gelling. The potato starch may, after subsequent cooking to gelatinize it, show some gelling properties.

Another heat-moisture treatment is described in U.S. Pat. No. 3,977,897 issued Aug. 31, 1976 to O. B. Wurzburg et al. It is carried out by the controlled heating at a specified pH of an aqueous suspension containing an amylose-containing starch in intact granule form and selected inorganic salts which are effective in raising the gelatinization temperature of the starch. The resulting starch is neither pregelatinized nor gelling.

The heat-moisture treatment disclosed in U.S. Pat. No. 4,013,799 issued Mar. 22, 1977 to W. J. Smalligan et al. is likewise carried out under conditions that are such that the tapioca starch does not gelatinize, nor is it gelling. The treatment is carried out by heating granular tapioca starch having a moisture content of about 15–35% for 1–72 hours at 70°–130° C.

The present invention provides an instant gelling tapioca starch or potato starch which forms at least a weak gel when dispersed in cold water (i.e., without cooking) and which is useful in low pH, as well as in high pH, food systems. In the preferred embodiment, the instant gelling starches are prepared without conversion or other chemical modification. A food system containing the instant gelling starches is also provided.

SUMMARY OF THE INVENTION

The instant gelling starches herein are drum-dried and subsequently heat-treated starches selected from the group consisting of native (raw) tapioca starch, native (raw) potato starch, and the lightly converted products thereof. They are characterized by being capable of forming at least weak gels. The gelling starches are further characterized by a reduced peak or maximum Brabender viscosity, which is within specified ranges for the native starches. The Brabender procedure used to measure this reduced viscosity is described hereafter.

The instant gelling starches prepared from native tapioca starches have a peak or maximum viscosity within the range of about 1000–4200 Brabender units (B.U.) and form at least weak gels having a Bloom strength of at least about 70 grams (g). Those prepared from native potato starch have a peak or maximum Brabender viscosity within the range of about 2400–4400 B.U. and form at least weak gels having a Bloom strength of at least about 70 g. They are prepared by heat treating drum-dried raw native tapioca or potato starch for about 1.5–24 hours (hr.) at 125°–180° C. The aqueous starch slurries have a pH of about 5–12 prior to the drum drying. The drum drying is carried out at a temperature sufficient to pregelatinize the starch, thereby rendering it cold-water-dispersible. The pH, time, and temperature used should be sufficient to provide starches having the above viscosity ranges and hence the desired gelling properties. In this preferred embodiment, the starch base employed is the native starch and hence a non-chemically modified instant gelling starch is produced.

In another embodiment, instant gelling starches can be prepared from lightly converted tapioca and potato starches which have been drum dried at a pH of about 6.5–12 and then heat treated at an appropriate pH for an appropriate period. They are capable of forming at least weak gels having a Bloom strength of at least about 65 g. After the conversion, the tapioca starches should have peak viscosities above about 775 Brabender units (B.U.) and the potato starches should have peak viscosities above about 1000 B.U., when measured by a Brabender procedure described hereafter. The converted drum-dried tapioca starches should be heat treated for about 6–16 hours at 125°–180° C., preferably 140°–150° C. using pH 8–12 converted starch. The converted, drum-dried potato starches should be heat treated for about 2–8 hours at 125°–180° C., preferably 140°–150° C. using pH 6.5–8 converted starch.

The present modified starches are useful in any food systems, even low pH systems, where a starch which will gel without further cooking is desired. They are particularly suited for use in pie and cream fillings, puddings, spreads, jellies and instant mixes of the type which are reconstituted with water or milk and allowed to set at room temperature. Food systems containing the starches herein will have properties, e.g., texture, appearance, gel structure and flavor, which closely resemble those of food systems which are cooked.

DESCRIPTION OF THE PREFERRED EMBODIMENTS

The starch base applicable herein is preferably tapioca or potato starch in its native form, but may also be a lightly converted tapioca or potato starch. The starch is converted to its fluidity or thin-boiling form using a suitable method of degradation which results in a converted starch having the viscosity defined hereafter, such as mild acid hydrolysis with an acid such as, e.g., sulfuric or hydrochloric acid, conversion with hydrogen peroxide, or enzyme conversion. Typically, the starch is acid-converted to provide a tapioca starch having a peak viscosity above about 775 B.U., preferably above 800 B.U., and a potato starch having a peak viscosity above about 1000 B.U. More highly converted starches, i.e. those having lower viscosities, do not form gelling starches when heat treated. Prior to conversion, native tapioca starch has a peak viscosity of about 2240 B.U. and native potato starch has a peak viscosity greater than 4500 B.U. The Brabender procedure used to measure the viscosity of the converted and native starch bases is described hereafter.

In the process herein, the starch is slurried in water before the drum drying step. To prevent excessive degradation on the drum drier, slurries of the native starches must have a pH of at least 5 and slurries of the converted starches must have a pH of at least 6.5. The pH of the slurries can be as high as 12. The preferred pH range for the native starch slurries is 6.5–10, most preferably 8–10, and for the converted starch slurries it is 8–12 for the tapioca starch and 6.5–8 for the potato starch. If the pH is less than the required minimum or if a more alkaline pH is desired, a base such as sodium hydroxide or ammonium hydroxide may be added to the slurry to increase the alkalinity thereof to within the required range.

The drum drying step is a well-known conventional method for simultaneously cooking and drying starch slurries on heated drums. This serves to pregelatinize the starch, thereby rendering it cold-water-dispersible. It is accomplished by feeding the starch slurry onto the single drum or double drums of a drum drier, usually through a perforated pipe or oscillating arm from a tank or vat provided with an agitator and a rotor. Drum drying is further discussed in Chapter XXII—"Production and Use of Pregelatinized Starch", Starch: Chemistry and Technology, Vol. II—Industrial Aspects, R. L. Whistler and E. F. Paschall, Editors, pp. 523–525 (Academic Press, New York 1967).

After drying, the starch is removed from the drum drier in sheet form and is preferably ground or pulverized to a powder using, e.g., a Fitz mill, Raymond mill or hammer mill, or it may be reduced to fine flakes. It is thereafter heated in any conventional heating device, such as a forced-air electric or gas oven, a heating plate, or dextrinizer. A microwave oven can be used for the heat-treatment, but it is difficult to prepare a gelling starch reproducibly. Typical heating in a standard electric or gas oven ranges from about 1.5–24 hr. at about 125°–180° C., with higher temperatures generally requiring shorter heating times. The heat treatment conditions given above for the native starches are only illustrative, and the pH, time, and temperature used should be sufficient to effect the required peak or maximum viscosity reduction to within the range of about 1000–4200 B.U. for drum-dried native tapioca starch and about 2400–4400 B.U. for drum-dried native potato starch. The resulting starches will then form at least weak gels having Bloom strengths of at least about 70 g.

Tapioca starches forming medium to strong gels and further characterized by a reduced peak or maximum viscosity of about 1050–4050 B.U. can be prepared from native starches drum dried at pH 6.5–12 and then heat treated for about 1.5–16 hr. at about 125°–180° C. Those forming strong to very strong gels and further characterized by a reduced peak or maximum viscosity of about 1150–3250 B.U. can be prepared from native starches drum dried at pH 6.5–12, preferably 6.5–10, and then heat treated for about 4–16 hr. at about 125°–150° C., preferably about 5–8 hr. at about 140°–150° C.

Potato starches forming medium to strong gels and further characterized by a reduced peak or maximum Brabender viscosity of about 2400–3700 B.U. can be prepared from native starches drum dried at pH 6.5–12 and then heat treated for about 4–24 hr. at about 140° C. Those capable of forming strong to very strong gels and further characterized by a reduced peak or maximum viscosity of 2350 B.U. can be prepared from native starches drum dried at pH 8–12 and then heat treated for about 8–16 hr. at about 140° C.

Brabender viscosities of the final starch products (i.e., the instant gelling starches) are best measured herein by the viscosity attained by the starch when it is heated to and held at a temperature of 30° C. in a viscometer, using a 350 cm-g cartridge. For native and converted tapioca starches, the viscosities are measured at 5.5% solids in a sugar solution. For the native and converted potato starches, the viscosities are measured at 5% solids in a sugar solution. If a peak viscosity is attained during the 30 minute period, it is recorded. If the viscosity does not peak, the maximum viscosity at 30 minutes of holding at 30° C. is recorded. The viscosity reduction should be sufficient to provide a gelling starch, with the peak or maximum viscosity being within the ranges given hereinabove for instant gelling starches prepared from native starch bases.

The final product obtained from the drum drying and subsequent heat treatment is a cold-water-dispersible starch which forms at least a weak gel when dispersed in water. The determination of gel formation and the measurement of gel strength are accomplished by subjective evaluation as well as by Bloom Gelometer readings. These two methods of measurement are not always consistent (due in part to the cohesiveness of some of the products), but for purposes herein, the present instant gelling starches must form at least a weak gel having the minimum Bloom strengths cited above.

In the examples which follow, all parts and percentages are given by weight and all temperatures in degrees Centigrade unless otherwise indicated. The following analytical and testing procedures are used in the examples to characterize the converted starches used as the starch bases and the final instant gelling starches.

A. BRABENDER EVALUATION OF CONVERTED STARCH BASES

The converted starch to be tested is slurried in a sufficient amount of distilled water to give 500 g. of slurry containing 35.4 g of anhydrous starch solids. The slurry (7.1% solids) is then poured into the Brabender cup, and the viscosity is measured using a VISCO/Amylo/GRAPH (manufactured by C. W. Brabender Instruments, Inc., Hackensack, N.J.) The starch slurry is rapidly heated to 50° C. and then heated further from 50° C. to 95° C. at a heating rate of 1.5° C. per minute, and the peak viscosity reading recorded. A 350 cm.-g. cartridge is used for all the viscosity readings.

B. BRABENDER EVALUATION OF DRUM-DRIED, HEAT-TREATED STARCHES

The instant gelling tapioca starches to be tested are dry-blended in an amount of 33 g. (anhydrous basis) with 165 g. sugar and the resultant blend is slowly added over a period of one minute to a Sunbeam Mixmaster (trademark) Kitchen Mixer operating at speed #1 and containing a sufficient amount of distilled water at 30° C. to bring the total charge weight of starch, sugar and water to 600 g. After the addition the mixture (5.5% starch solids) is immediately poured into a Brabender cup and the viscosity is measured by the VISCO/Amylo/GRAPH. The mixture is rapidly heated to 30° C. with the cooling switch set in a controlled position. The temperature is maintained at 30° C. until the peak viscosity is attained or until a maximum time of 30 minutes has expired if there is no peak viscosity. All viscosity readings herein are made using a 350 cm.-g. cartridge.

For the instant gelling potato starches, the above procedure is used except that the starch is dry-blended in an amount of 30 g. (anhydrous basis) instead of 33 g. to give a mixture containing 5% starch solids.

C. GELLING EVALUATION OF THE DRUM-DRIED, HEAT-TREATED STARCHES

A total of 7.0 g. of instant gelling starch sample and 20.0 g. of sugar are dry-mixed by shaking in a 4-oz. (118 ml. jar. This dry mixture is added slowly to 100 ml. distilled water and mixed in a Mixmaster mixer at speed #2 for a period of one minute. The resulting mixture is then poured into a 4-oz. (118-ml.) jar and placed in a refrigerator (at 15° C.) for about 16 hours. After this period, the mixture is removed from the refrigerator and allowed to stand at room temperature for 0.5 hours to give a temperature of 19+1° C. The sample is evaluated for Bloom strength using a Bloom Gelometer (Precision Scientific Co., Chicago, Ill.) with a 1-in. (2.54-cm.)-diameter plunger. The gel is additionally evaluated by hand by inverting the jar and removing the sample, noting whether the form is retained. The sample is judged by degrees as being stable (fluid), set (retains some form as lumps, but when stirred, becomes fluid), weak gel (retains some form and is able to be cut, but is only a soft gel), medium gel (retains more of its form), or strong gel (retains complete form and cuts cleanly). The relationship between Bloom strength and hand evaluation is not always consistent, and, in addition, starch bases having the same hand evaluation may have different Bloom strengths. In general, a relationship can be made as follows:

| Hand Evaluation of Gel | Bloom Strength (g.) |
|---|---|
| Tapioca and Potato (native) | |
| strong to very strong | 100 or more |
| medium to strong | 90–100 |
| weak to medium | 70–90 |
| very weak, set, or stable | 70 or less |
| Tapioca and Potato (converted) | |
| very weak, set or stable | 65 or less |

To evaluate a gel accurately one should take into account both the Bloom strength and the visual description thereof, i.e., the gel should have both the required description (at least a weak gel) and required minimum Bloom strength (at least about 65–70 g. depending upon the starch base).

EXAMPLE I

This example illustrates drum drying and heating of native tapioca starch in a forced air oven to provide the instant gelling starches herein.

A total of 1000 g. of native tapioca starch bases (Starch Samples A-L) was slurried in 3000 ml. water. The pH of the slurries varied from pH 3.0–12.0 and was adjusted to the indicated levels by adding a common acid or base thereto. Each slurry was thereafter dried on a steamheated steel double-drum drier with the following specifications: Drum speed: 5 rpm, Drum length: 1.5 feet (45.7 cm.), Drum diameter: 1 foot (30.5 cm.), Temperature: 146°–154° C.

The pregelatinized starch sheets thus obtained were thereafter pulverized through the 0.01 in. (0.25 mm.) screen of a Raymond Mill.

A total of 100 g. of each starch sample was weighed directly in a 16-oz. (473-ml.) wide-mouthed glass jar and placed in a forced air electric oven Model OV-490 manufactured by Blue M Electric Co. The samples were heat treated at about 125°–180° C. for from about 0.25–16 hr. The resulting starch products were evaluated for gel strength and Brabender viscosity using Tests B and C described above. The results are given in Table I.

The results show that the starch slurry to be drum dried must have a pH of at least about 5 to provide gelling starches. Gelling starches were prepared from drum-dried pH 5–12 starches which were heat treated for about 1.5–16 hours at 125°–180° C. to effect the viscosity reduction to within the range of 1000–4200 B.U.

upon the temperature used during the heat treatment, as well as the pH used during the drum drying step. Typically, higher temperature required shorter heat treatment times. At 140° C., heat treatment for more than 4 hr. and up to 16 hr. of drum-dried starches having a pH of about 6–10 generally produced medium to strong or strong gels. The 140° C.-8 hr. treatment of the pH 10 starch (Sample No. I-J-4) produced the starch forming the strongest gel (124 g. Bloom strength), but the same heat treatment of a pH 12 starch (Sample No. I-K-4) did not produce a gelling starch (set product with a 63 g. Bloom strength).

EXAMPLE II

This example illustrates the use of a dextrinizer as the heating device in the process herein.

A total of 1200 g. of native tapioca starch drum-dried from a slurry of pH 7 to a moisture content of 2.5% as described in Example I was placed in a dextrinizer having a bath temperature of 20° C. and heated to 149° C. The starch was held for 2–6 hr. at 149° C. and evaluated

TABLE I

| Starch Sample (native) | | Drum Drying | Heat Treatment | | Drum-Dried, Heat-Treated Starch | | | |
|---|---|---|---|---|---|---|---|---|
| | | | | | Brabender Viscosity (B.U.) | | Bloom Strength | Hand |
| No. | Type | (pH) | Time (hr.) | Temperature (°C.) | Peak | Maximum (30 min.) | (g.) | Evaluation |
| I-A-1* | Tapioca | 3.0 | 4 | 140 | — | 70 (20 min.) | N.M. | stable |
| I-A-2* | Tapioca | 3.0 | 6 | 140 | — | too thin — | N.M. | stable, watery |
| I-B-1* | Tapioca | 4.0 | 4 | 140 | 2630 | — | N.M. | set (cohesive) |
| I-B-2* | Tapioca | 4.0 | 8 | 140 | 1700 | — | 58 | set |
| I-C-1 | Tapioca | 5.0 | 4 | 140 | 3820 | — | 76 | weak to medium gel |
| I-C-2 | Tapioca | 5.0 | 8 | 140 | 2525 | — | 75 | medium gel |
| I-D-1* | Tapioca | 6.0 | 4 | 140 | 4800 | — | 66 | set |
| I-D-2 | Tapioca | 6.0 | 8 | 140 | — | 2200 | 111 | medium to strong gel |
| I-D-3 | Tapioca | 6.0 | 16 | 150 | 1080 | — | 98 | strong gel |
| I-E-1* | Tapioca | 6.5 | 2 | 140 | — | too heavy — | 56 | weak (sticky) |
| I-E-2 | Tapioca | 6.5 | 4 | 140 | — | 4180 | 85 | medium gel |
| I-E-3 | Tapioca | 6.5 | 6 | 140 | — | 3200 | 88 | medium to strong gel |
| I-E-4 | Tapioca | 6.5 | 8 | 140 | — | 1975 | 112 | strong gel |
| I-E-5 | Tapioca | 6.5 | 16 | 140 | 1175 | — | 106 | strong gel |
| I-E-6* | Tapioca | 6.5 | 0.25 | 180 | — | too heavy — | N.M. | stable |
| I-E-7* | Tapioca | 6.5 | 0.5 | 180 | | N.D. | N.M. | stable |
| I-E-8* | Tapioca | 6.5 | 1.0 | 180 | | N.D. | 21 | set |
| I-E-9 | Tapioca | 6.5 | 1.5 | 180 | — | 1360 | 92 | strong gel |
| I-F-1* | Tapioca | 7.0 | 2 | 140 | 6900 | — | N.M. | stable (cohesive) |
| I-F-2* | Tapioca | 7.0 | 4 | 140 | 5860 | — | 68 | weak gel |
| I-F-3 | Tapioca | 7.0 | 16 | 125 | — | 3230 | 104 | strong gel |
| I-G-1* | Tapioca | 8.0 | 2 | 140 | — | too heavy — | N.M. | stable (cohesive) |
| I-G-2 | Tapioca | 8.0 | 6 | 140 | 3200 | — | 95 | medium to strong gel |
| I-I-1* | Tapioca | 9.0 | 2 | 140 | 5200 | — | N.M. | stable (cohesive) |
| I-I-2 | Tapioca | 9.0 | 6 | 140 | 2455 | — | 106 | strong gel |
| I-J-1* | Tapioca | 10.0 | 2 | 140 | — | too heavy — | 65 | set |
| I-J-2 | Tapioca | 10.0 | 4 | 140 | 4050 | — | 97 | strong gel |
| I-J-3 | Tapioca | 10.0 | 6 | 140 | 3245 | — | 95 | strong gel |
| I-J-4 | Tapioca | 10.0 | 8 | 140 | 2350 | — | 124 | very strong gel |
| I-K-1 | Tapioca | 12.0 | 2 | 140 | 3670 | — | 74 | weak gel |
| I-K-2 | Tapioca | 12.0 | 4 | 140 | 1390 | — | 98 | strong gel |
| I-K-3 | Tapioca | 12.0 | 6 | 140 | 1305 | — | 109 | strong gel |
| I-K-4* | Tapioca | 12.0 | 8 | 140 | 965 | — | 63 | set |

*These starches either did not gel or did not form gels having both the required hand evaluation (weak gel) and required Bloom strength (70 g.). They are outside the scope of the invention and only included for comparative purposes.
N.M. signifies that the Bloom strength was not measurable.
N.D. signifies that the value was not determined.

Heat-treated starches having viscosities within this range formed weak to very strong gels having Bloom strengths within the range of 74–124 g. The starch having a viscosity below 1000 B.U. (see I-K-4) did not gel. The starches having viscosities above 4200 B.U. either did not gel (see I-E-6, I-F-1, I-G-1 and I-J-1) or formed a weak gel having a Bloom strength below 70 g. (see I-E-1 and I-F-2).

The results also show that the time needed to effect the required viscosity reduction depends somewhat for viscosity and gel strength. The results are indicated in Table II.

TABLE II

| Starch Sample (native) | | Heat Treatment | | Drum-Dried, Heat-Treated Starch | | |
|---|---|---|---|---|---|---|
| No. | Type | Time (hr.) | Temperature (°C.) | Peak Brabender Viscosity (B.U.) | Bloom Strength (g.) | Hand Evaluation |
| II-A* | Tapioca | 2 | 149 | — | 55 | set |
| II-B | Tapioca | 4 | 149 | 2890 | 104 | strong gel |
| II-C | Tapioca | 5 | 149 | 2890 | 121 | strong gel |
| II-D | Tapioca | 6 | 149 | 2100 | 104 | strong gel |

*Non-gelling instant starch included for comparative purposes only.

The results show that the heat treatment can be carried out in a dextrinizer and that gelling starches characterized as strong (Bloom strengths above 100 g.) and having peak viscosities within the range of 2100-2900 B.U. were prepared from pH 7 drum-dried starches heat treated for from 4-6 hours at 149° C.

EXAMPLE III

This example illustrates the use of potato starch in preparing the instant gelling starches herein.

Native potato starch was slurried in water adjusted to give a pH of from 5.55 to 12.0 and then drum dried as described in Example I. The drum-dried starch was pulverized and heated in the forced-air oven of Example I at 140°-180° C. for from 0.25 to 24 hours. The results of the viscosity and gel strength evaluations are given in Table III.

The results show that instant gelling potato starches may also be prepared from slurries drum dried at about pH 5 to 12. Drum-dried, heat-treated starches having reduced viscosities within the required range of 2400-4400 B.U. formed gels characterized as weak to very strong (Bloom strengths of about 71-235 g.).

did not gel, i.e. one was stable with a non-measurable Bloom strength and the other was set with a Bloom strength of about 55 g.

Starches forming medium to strong gels and further characterized by reduced peak or maximum viscosities of about 2420-3650 B.U. were prepared from drum-dried pH 6.5-12 starches which were subsequently heat treated for 4-24 hours at 140° C. Those forming strong to very strong gels were prepared from drum-dried pH 8-12 starches which were subsequently heat treated for 8-16 hr. at 140° C.

EXAMPLE IV

This example illustrates the use of converted starches in preparing the instant gelling starches herein. The converted starches were drum dried as described in Example I prior to the heat treatment.

Two portions of tapioca starch and two portions of potato starch were stirred in distilled water and heated in a water bath to 45° C. Then, concentrated hydrochloric acid was added and the mixtures were stirred at 45° C. for 16 hr. The hydrolyses were stopped by neutralizing the mixtures with 3% sodium hydroxide solution to a pH of 5.5-6.5. The slurries were thereafter filtered, washed and dried. In this manner, various converted tapioca starches and converted potato starches were prepared. Their peak viscosity was determined using the Brabender procedure (A) described previously.

The Brabender peak viscosity of the converted starches, the pH of the starch slurry which was drum dried, and the heat treatment conditions are given in Table IV.

The results show that lightly converted tapioca starches having a peak viscosity above about 775 B.U. can be heat treated subsequent to drum drying to effect a reduction in their peak or maximum viscosity and to thus provide instant gelling starches. These heat-treated starches (drum dried at pH 6.5-12) formed weak to

TABLE III

| Starch Sample (native) | | Drum Drying (pH) | Heat Treatment | | Drum-Dried, Heat-Treated Starch | | |
|---|---|---|---|---|---|---|---|
| No. | Type | | Time (hr.) | Temperature (°C.) | Peak Brabender Viscosity (B.U.) | Bloom Strength (g.) | Hand Evaluation |
| III-A-1* | Potato | 5.5 | 2 | 140 | N.D. | N.M. | stable |
| III-A-2 | Potato | 5.5 | 8 | 140 | N.D. | 72 | weak to medium gel |
| III-A-3* | Potato | 5.5 | 24 | 140 | N.D. | N.M. | water-thin, separated |
| III-B-1* | Potato | 6.5 | 0.25 | 180 | too heavy | N.M. | stable |
| III-B-2* | Potato | 6.5 | 0.5 | 180 | N.D. | N.M. | stable |
| III-B-3* | Potato | 6.5 | 1.0 | 180 | N.D. | 24 | set |
| III-B-4 | Potato | 6.5 | 1.5 | 180 | 3050 | 71 | medium |
| III-C-1 | Potato | 8.0 | 4 | 140 | 4370 | 80 | weak gel |
| III-C-2 | Potato | 8.0 | 6 | 140 | N.D. | 99 | strong gel |
| III-C-3 | Potato | 8.0 | 24 | 140 | N.D. | 186 | very strong gel |
| III-D-1* | Potato | 10.0 | 2 | 140 | N.D. | N.M. | stable |
| III-D-2 | Potato | 10.0 | 4 | 140 | 3650 | 104 | medium gel |
| III-D-3 | Potato | 10.0 | 16 | 140 | N.D. | 235 | very strong gel |
| III-E-1* | Potato | 12.0 | 2 | 140 | N.D. | N.M. | stable |
| III-E-2* | Potato | 12.0 | 4 | 140 | N.D. | N.M. | stable |
| III-E-3* | Potato | 12.0 | 6 | 140 | too heavy | 55 | set |
| III-E-4 | Potato | 12.0 | 8 | 140 | 2420 | 125 | strong gel |

*Instant starches which did not gel or formed weak gels having Bloom strengths below 70 g. and which are included for comparative purposes only.

The instant gelling starches were prepared at temperatures of from 140°-180° C. using treatment times from about 1.5-24 hr., provided the time, temperature, and pH selected were sufficient to provide the required final viscosity. The starches where the viscosity reduction was not achieved and the slurries were too heavy for the viscosity to be determined (see III-B-1 and III-E-3)

strong gels having Bloom strengths of about 65-101 g. The more highly converted starches (Samples IV-A and IV B) did not gel. Lightly converted starches which were not heat treated long enough likewise did not gel (see IV-E-1 & 2, IV-F-1 & 2, and IV-G-1, 2, & 3). It is thus shown that the heat treatment of converted, drum-dried tapioca starches should be carried out for at least 6 hours and up to 16, with the higher pH starches (8-12) requiring shorter heat treatment times.

Instant gelling starches can also be prepared by heat treating lightly converted potato starches having viscosities above 1000 B.U. These heat-treated starches (drum dried pH 6.5-8) formed weak to medium gels having Bloom strengths of about 65-133 g. The more highly converted starches (Samples IV-H and IV-I) did not gel. Lightly converted starches which were heat treated for too long a time likewise did not gel (see IV-K-4 & 5). It is thus shown that the heat treatment of converted, drum dried potato starches should be carried out for from 2-8 hours.

The above results indicate that the converted starches are more sensitive to the heat treatment time than the native starches, specifically too short a treatment time will not produce gelling tapioca starches and too long a treatment time will not produce gelling potato starches.

In general, a longer treatment time is required to produce a comparable gel with the converted tapioca starches. Converted, drum-dried tapioca starches (pH 6.5) heat treated for 4-16 hours (IV-D-1 to 4 and IV-F-1 to 5 of Table IV) either did not gel (set with Bloom strengths of 50-54 g.) or formed only weak to medium gels (65-86 g. Bloom strengths) depending upon the fluidity, whereas the native, drum-dried starches similarly heat treated (I-E-2 to 5 of Table I) formed medium to strong gels (85-112 g. Bloom strength). Even at pH 12 a longer heat treatment was required for the converted, drum-dried tapioca starch, e.g., 8 l hrs. (IV-E-4 of Table IV) vs. 4 hrs. (I-K-2 of Table I) to form a strong gel (98-101 g. Bloom strengths).

The results also indicate that the converted starches are more sensitive to the pH prior to drum drying, with a minimum pH of 6.5 being required.

EXAMPLE V

This example illustrates the use of a microwave oven to heat treat the native starches.

A total of 100 g. of native tapioca or potato starch was drum dried as described in Example I, placed in a Petri dish in a Varian microwave oven (made by Varian Industrial Systems Activity, Model PPs-2.5A Power Pack with an operating range of 115 volts to over 6

TABLE IV

| | Starch Sample (converted) | | | | | Drum-Dried, Heat-Treated Starch | | | |
|---|---|---|---|---|---|---|---|---|---|
| | | Brabender Peak Viscosity | Drum Drying | Heat Treatment | | Brabender Viscosity | | Bloom Strength | Hand |
| No. | Type | (B.U.) | (pH) | Time (hr.) | Temperature (°C.) | Peak | Maximum | (g.) | Evaluation |
| IV-A-1* | Tapioca | 440 | 5.5 | 4 | 150 | 1420 | — | N.M. | stable |
| IV-A-2* | Tapioca | 440 | 5.5 | 8 | 150 | 690 | — | N.M. | stable |
| IV-A-3* | Tapioca | 440 | 5.5 | 16 | 150 | 300 | — | N.M. | stable |
| IV-B-1* | Tapioca | 775 | 6.5 | 2 | 140 | N.D. | | N.M. | stable |
| IV-B-2* | Tapioca | 775 | 6.5 | 4 | 140 | N.D. | | N.M. | stable |
| IV-B-3* | Tapioca | 775 | 6.5 | 6 | 140 | N.D. | | N.M. | stable |
| IV-B-4* | Tapioca | 775 | 6.5 | 8 | 140 | N.D. | | N.M. | stable |
| IV-C-1 | Tapioca | 790 | 8.0 | 8 | 150 | 1570 | — | 68 | weak to medium gel |
| IV-D-1* | Tapioca | 825 | 6.5 | 2 | 140 | N.D. | | N.M. | stable |
| IV-D-2* | Tapioca | 825 | 6.5 | 4 | 140 | N.D. | | 51 | set |
| IV-D-3* | Tapioca | 825 | 6.5 | 6 | 140 | N.D. | | 50 | set |
| IV-D-4* | Tapioca | 825 | 6.5 | 8 | 140 | 1560 | — | 53 | set |
| IV-D-5* | Tapioca | 825 | 6.5 | 16 | 140 | N.D. | | N.M. | set |
| IV-E-1* | Tapioca | 825 | 12.0 | 2 | 140 | N.D. | | N.M. | stable |
| IV-E-2* | Tapioca | 825 | 12.0 | 4 | 140 | N.D. | | N.M. | stable |
| IV-E-3 | Tapioca | 825 | 12.0 | 6 | 140 | 1705 | — | 79 | medium to strong |
| IV-E-4 | Tapioca | 825 | 12.0 | 8 | 140 | — | 1200 | 101 | strong |
| IV-F-1* | Tapioca | 1015 | 6.5 | 2 | 140 | N.D. | | N.M. | stable |
| IV-F-2* | Tapioca | 1015 | 6.5 | 4 | 140 | N.D. | | N.M. | stable |
| IV-F-3 | Tapioca | 1015 | 6.5 | 6 | 140 | 2275 | — | 54 | set |
| IV-F-4 | Tapioca | 1015 | 6.5 | 8 | 140 | 1880 | — | 65 | weak |
| IV-F-5 | Tapioca | 1015 | 6.5 | 16 | 140 | — | 1570 | 86 | medium to strong |
| IV-G-1* | Tapioca | 1700 | 6.5 | 2 | 140 | N.D. | | N.M. | stable |
| IV-G-2 | Tapioca | 1700 | 6.5 | 4 | 140 | N.D. | | 60 | weak |
| IV-G-3* | Tapioca | 1700 | 6.5 | 6 | 140 | 3380 | — | 58 | set |
| IV-G-4 | Tapioca | 1700 | 6.5 | 8 | 140 | 2580 | — | 60 | weak |
| IV-G-5 | Tapioca | 1700 | 6.5 | 16 | 140 | 2180 | — | 82 | medium to strong |
| IV-H-1* | Potato | a. | 5.5 | 0 | 150 | N.D. | | 69 | set |
| IV-H-2* | Potato | a. | 5.5 | 4 | 150 | N.D. | | 45 | slight set |
| IV-H-3* | Potato | a. | 5.5 | 8 | 150 | N.D. | | N.M. | stable |
| IV-H-4* | Potato | a. | 5.5 | 16 | 150 | N.D. | | N.M. | stable |
| IV-I-1* | Potato | b. | 6.5 | 2 | 140 | N.D. | | N.M. | stable |
| IV-I-2* | Potato | b. | 6.5 | 4 | 140 | N.D. | | N.M. | stable |
| IV-I-3* | Potato | b. | 6.5 | 6 | 140 | N.D. | | N.M. | stable |
| IV-I-4* | Potato | b. | 6.5 | 8 | 140 | N.D. | | N.M. | stable |
| IV-J-1 | Potato | 1080 | 8.0 | 8 | 150 | 510 | — | 133 | medium gel |
| IV-K-1 | Potato | 1835 | 6.5 | 2 | 140 | 2240 | — | 121 | medium (lumpy) |
| IV-K-2 | Potato | 1835 | 6.5 | 4 | 140 | 1970 | — | 100 | medium (lumpy) |
| IV-K-3 | Potato | 1835 | 6.5 | 6 | 140 | 1970 | — | 65 | weak |
| IV-K-4* | Potato | 1835 | 6.5 | 8 | 140 | N.D. | | N.M. | stable |
| IV-K-5* | Potato | 1835 | 6.5 | 16 | 140 | 1090 | — | 57 | stable |

*Instant converted starches which did not gel or formed weak gels having Bloom strengths below 65 g. and which are included for comparative purposes only.
a. Converted starches having a water fluidity of 26 - see U.S. Pat. No. 4,207,355 (cited previously) for the method used to determine water fluidity.
b. Converted starches having a water fluidity of 15.3.

kilovolts), and heated for the indicated time and input power. The Brabender viscosities and gel evaluations are given in Table V.

The results show that several gelling tapioca starches and one gelling potato starch can be prepared, but not readily or reproducibly prepared, by microwave heat-treatment. The treatment also tends to char the starch when long treatment times are required.

TABLE V

| Starch Sample (native) | | Drum Drying (pH) | Microwave Heat Treatment* | | Drum-Dried, Microwave-Treated Starch | | | |
|---|---|---|---|---|---|---|---|---|
| | | | Time (min.) | Power (kw.) | Brabender Viscosity | | Bloom Strength (g.) | Hand Evaluation |
| No. | Type | | | | Peak | Maximum | | |
| VI-A | Tapioca | 6.5 | 5 | 1 | 4780 | — | 86 | medium (sticky) |
| VI-A | Tapioca | 6.5 | 7 | 1 | 5150 | — | 73 | set |
| VI-A | Tapioca | 6.5 | 9 | 1 | — | 2190 | 88 | medium to strong |
| VI-B | Tapioca | 7.0 | 7 | 1 | 7540 | — | 67 | set |
| VI-C | Tapioca | 6.5 | 2 | 2 | N.D. | | N.M. | stable |
| VI-C | Tapioca | 6.5 | 4 | 2 | N.D. | | 53 | set |
| VI-C | Tapioca | 6.5 | 6 | 2 | N.D. | | 54 | set |
| VI-D | Tapioca | 7.0 | 1.5 | 2 | too heavy | | N.M. | stable (cohesive) |
| VI-D | Tapioca | 7.0 | 2.5 | 2 | 5340 | — | 88 | medium gel |
| IV-E | Potato | 6.5 | 7 | 1 | N.D. | | N.M. | stable |
| IV-E | Potato | 6.5 | 9 | 1 | N.D. | | N.M. | stable |
| IV-E | Potato | 6.5 | 12 | 1 | N.D. | | 53 | set |
| IV-E | Potato | 6.5 | 13 | 1 | N.D. | | 50 | set |
| IV-E | Potato | 6.5 | 15 | 1 | N.D. | | 55 | set |
| IV-E | Potato | 6.5 | 16 | 1 | N.D. | | 65 | weak to medium |

*The treatment after the first 5 mins. of heating was not continuous since it was necessary to cool the starch for about 5 min. to prevent charring and to repeat this cooling every few minutes. The starch heated for 16 min. was almost charred.

EXAMPLE VI (comparative)

This example illustrates that the starch herein cannot be just any type of starch.

A series of native waxy maize starch bases were slurried in water to pH 8.0 and drum dried and heated at 140° C. for 2-8 hours as described in Example I. The resulting starches were stable to gelling, and the starch heated for 8 hours had a Brabender viscosity which was too heavy.

EXAMPLE VII (comparative)

This example demonstrates the importance of the heat treatment subsequent to drum drying. It shows that heat treatment prior to drum drying does not produce a gelling starch and that drum drying without heat treatment does not produce a gelling starch.

PART A

A native tapioca starch was prepared according to the method of Example I of U.S. Pat. No. 4,013,799 (cited previously). Unmodified tapioca starch (about 12.1% moisture) was sprayed with 65 g. of distilled water (pH about 5.5-6) to provide a sample containing 25 wt.% total moisture. The starch was placed in a closed jar and heated in an oven for 4 hr. at 108° C.; the resulting starch (about 10 wt. % moisture) was allowed to air dry. A sample of the heat/moisture-treated starch was evaluated, as previously described, for gelling. The aqueous dispersion separated, and the starch settled to the bottom.

A sample of the heat/moisture-treated tapioca starch was then slurried at 40% solids in distilled water (pH 5.5-6) and drum dried on a single steam-heated steel drum, with a steam pressure of 105-110 psi. (142°-145° C.) The drier had the following specifications:

Feed Roller Speed: 52.86 RPM
Feed Roller Length: 10 in. (25.4 cm.)
Feed Roller Diameter: 2 in. (5.08 cm.)
Drum Speed: 5.08 RPM
Drum Roller Length: 10 in. (25.4 cm.)
Feed Roller Length: 2 in. (5.08 cm.)

Samples of the resulting cold-water-dispersible starch were evaluated for both their Brabender viscosity and gelling properties using the procedure previously described. The heat/moisture-treated drum-dried starch did not gel and, when removed from the jar, the paste spread out and formed a circular viscous puddle.

PART B

Native tapioca starch was slurred at 40% solids in distilled water (pH 5.5-6) and drum dried on the steam-heated steel drum, described in Example I, with a steam pressure of 80 psi. (146°-148° C.). The resulting cold-water-dispersible starch was evaluated as before. The aqueous dispersion of the starch was a heavy viscous paste with a viscosity of greater than 4500 B.U. The drum-dried starch showed no gelling properties, and, when removed from the jar, the paste spread out forming a circular viscous puddle similar to the heat/moisture-treated, drum-dried starch of Part A.

A portion of the above cold-water-dispersible starch was then heat treated, according to the present invention, for 8 hr. at 150° C. and evaluated. The starch dispersion had a peak viscosity of 2375 B.U. (Procedure B). The heat-treated, drum-dried starch formed a strong gel having a Bloom strength of 91 g. After removal from the jar, the gel retained its form and cut cleanly.

EXAMPLE VIII

This example illustrates the preparation of a low pH food product containing the instant gelling starch herein.

A lemon pie filling was prepared employing the following ingredients in the indicated amounts:

| | |
|---|---|
| Starch Sample II-D of Example II | 7.31% |
| Lemon Crystals #7 | 0.98% |
| Water | 69.70% |
| Sugar | 20.82% |
| Egg Yolk Solids | 1.07% |
| F.D. & C. Yellow #5 | 0.12% |

-continued

| | |
|---|---|
| | 100.00% |

All dry ingredients were first blended thoroughly. The water was placed in the mixing bowl of a Mixmaster mixer, and the dry mix was added to the liquid while mixing at a low speed (#2) until smooth. The filling thus obtained was placed in a baked pie crust and refrigerated for a minimum of one hour. The resulting pie filling had a short, tender gel which cut easily. The flavor as well as the texture and mouth-feel of the filling was good.

EXAMPLE IX

This example illustrates the preparation of instant imitation grape jellies employing the instant gelling starches herein.

The following ingredients were employed:

| | |
|---|---|
| Starch Samples No. I-E-9 of Example I | 5.95% |
| Sugar | 29.00% |
| Sodium Benzoate | 0.09% |
| Unsweetened Concord Grape Juice | 45.00% |
| Water | 19.96% |
| | 100.00% |

The solid ingredients were blended together and added to the liquids in the mixing bowl of a Sunbeam Mixmaster mixer and mixed on low speed for 2-3 min. The resulting mixture was refrigerated for a minimum of 4 hr. A similar mixture was prepared using Starch Sample I-J-3 of Example I.

The resultant jellies had a cleanly cutting jelly texture, which was notable because large amounts of sugar (65%) are usually added to the jelly to obtain these properties, as would be necessary if pectin, the typical gelling agent for jellies, were employed.

EXAMPLE X

This example describes the preparation of an instant vanilla Bavarian cream employing the instant gelling starch herein.

The following ingredients should be employed:

| | |
|---|---|
| Starch Sample No. I-E-9 or I-J-3 of Example I | 25.300% |
| Capsul-Lok (trademark) Artificial Vanilla Flavor | 0.040% |
| Sugar, Bakers Special Grind | 69.400% |
| Spray-dried Vegetable Oil Base | 4.100% |
| Salt | 0.842% |
| Titanium Dioxide | 0.300% |
| Color: Atlene Medium Yellow Egg Shade #640 (from H. Kohnstamm) | 0.800% |
| | 100.000% |

All ingredients are dry-blended thoroughly. Then 103.65 g. of this dry mix is added to 300 ml. of cold water in the mixing bowl of a Mixmaster Mixer and mixed at medium speed (#4) for 2-3 min. The resulting cream is refrigerated for a minimum of 4 hr.

The resultant cream should have a short tender gel which cuts cleanly and should have a desirable flavor and texture.

In summary, the present invention is seen to provide modified tapioca and potato starches having unique gelling properties when dispersed in cold water, which starches are preferably not chemically altered in any manner.

Now that the preferred embodiments of the invention have been described in detail, various modifications and improvements thereon will become readily apparent to the practitioner. Accordingly, the spirit and scope of the present invention are to be limited only by the appended claims, and not by foregoing specification.

What is claimed is:

1. A cold-water-dispersible gelling starch, which comprises a drum-dried and subsequently heat-treated tapioca starch or potato starch which is characterized by being capable of forming at least a weak gel having a Bloom strength of at least about 70 grams and further characterized by having a reduced peak or maximum Brabender viscosity within the range of about 1000–4200 B.U. for said tapioca starch or within the range of 2400–4400 B.U. for said potato starch, said viscosity being measured at 5.5% solids for said tapioca starch or at 5% solids for said potato starch in a sugar solution at 30° C. over a 30 minute period; said starch being a native starch having a pH of about 5–12 prior to said drum drying; said drum drying being carried out at a temperature sufficient to pregelatinize said starch and render it cold-water-dispersible; and said heat-treatment being carried out at up to 180° C. for a time and at a temperature and pH sufficient to reduce said peak or maximum Brabender viscosity to said ranges.

2. The gelling starch of claim 1, wherein said gelling tapioca starch is capable of forming a medium to strong gel and is further characterized by having a peak or maximum Brabender viscosity within the range of about 1050–4050 B.U.

3. The gelling starch of claim 1, wherein said gelling tapioca starch is capable of forming a strong to very strong gel and further characterized by having a peak or maximum Brabender viscosity within the range of 1150–3250 B.U.

4. The gelling starch of claim 1, wherein said gelling potato starch is capable of forming a medium to strong gel and further characterized by having a peak or maximum Brabender viscosity within the range of about 2400–3700 B.U.

5. A cold-water-dispersible gelling starch, which is prepared by heat treating a drum-dried tapioca or potato starch; said starch being a native starch having a pH of about 5–12 prior to said drum drying at a temperature sufficient to pregelatinize said starch, thereby rendering it cold-water-dispersible; said heat treatment being carried out for about 1.5–24 hours at about 125°–180° C., said pH, time, and temperature being sufficient to provide a gelling starch capable of forming at least weak gel having a Bloom strength of at least about 70 grams.

6. The gelling starch of claim 5, wherein said heat treatment is carried out for about 4–16 hours at about 125°–150° C. and wherein said starch has a pH of about 6.5–12.

7. The gelling starch of claim 5, wherein said heat treatment is carried out for about 5–8 hours at about 140°–150° C. and wherein said starch has a pH of about 6.5–10.

8. A cold-water-dispersible gelling starch, which comprises a drum-dried and subsequently heat-treated tapioca starch or potato starch; said starch being converted tapioca starch having a peak Brabender viscosity greater than about 775 B.U. or converted potato starch having a peak Brabender viscosity greater than about 1000 B.U. and having a pH of about 6.5–12 prior to said drum drying at a temperature sufficient to pregelatinize said starch, thereby rendering it cold-water-dispersible; said viscosity of said converted starch being measured at 7.1% solids in an aqueous solution after slow heating from 50° to 95° C. over a 30 minute period; said heat treatment being carried out for about 6–16 hours at 125°–180° C. for said tapioca starch or for about 2–8 hours at 125°–180° C. for said potato starch, said pH, time, and temperature being sufficient to provide a gelling starch capable of forming at least a weak gel having a Bloom strength of at least about 65 grams.

9. The gelling starch of claim 8, wherein said gelling tapioca starch is capable of forming at least a medium gel; wherein said heat-treatment is carried out at about 140°–150° C.; and wherein said converted tapioca starch has a pH of about 8–12 and a viscosity of about 800–1750 B.U.

10. The gelling starch of claim 8, wherein said gelling potato starch is capable of forming at least a medium gel; wherein said heat treatment is carried out at about 140°–150° C.; and wherein said converted potato starch has a pH of about 6.5–8 and a viscosity of about 1000–1850 B.U.

11. The gelling starch of claim 9 or 10, wherein said converted starch is an acid-converted starch.

12. A food system containing the gelling starch of claim 1.

13. A food system containing the gelling starch of claim 5.

14. A food system containing the gelling starch of claim 8.

* * * * *